May 7, 1929. G. HOMIAK 1,712,347
TIRE RIM HOLDER AND ADJUSTER
Filed July 16, 1927
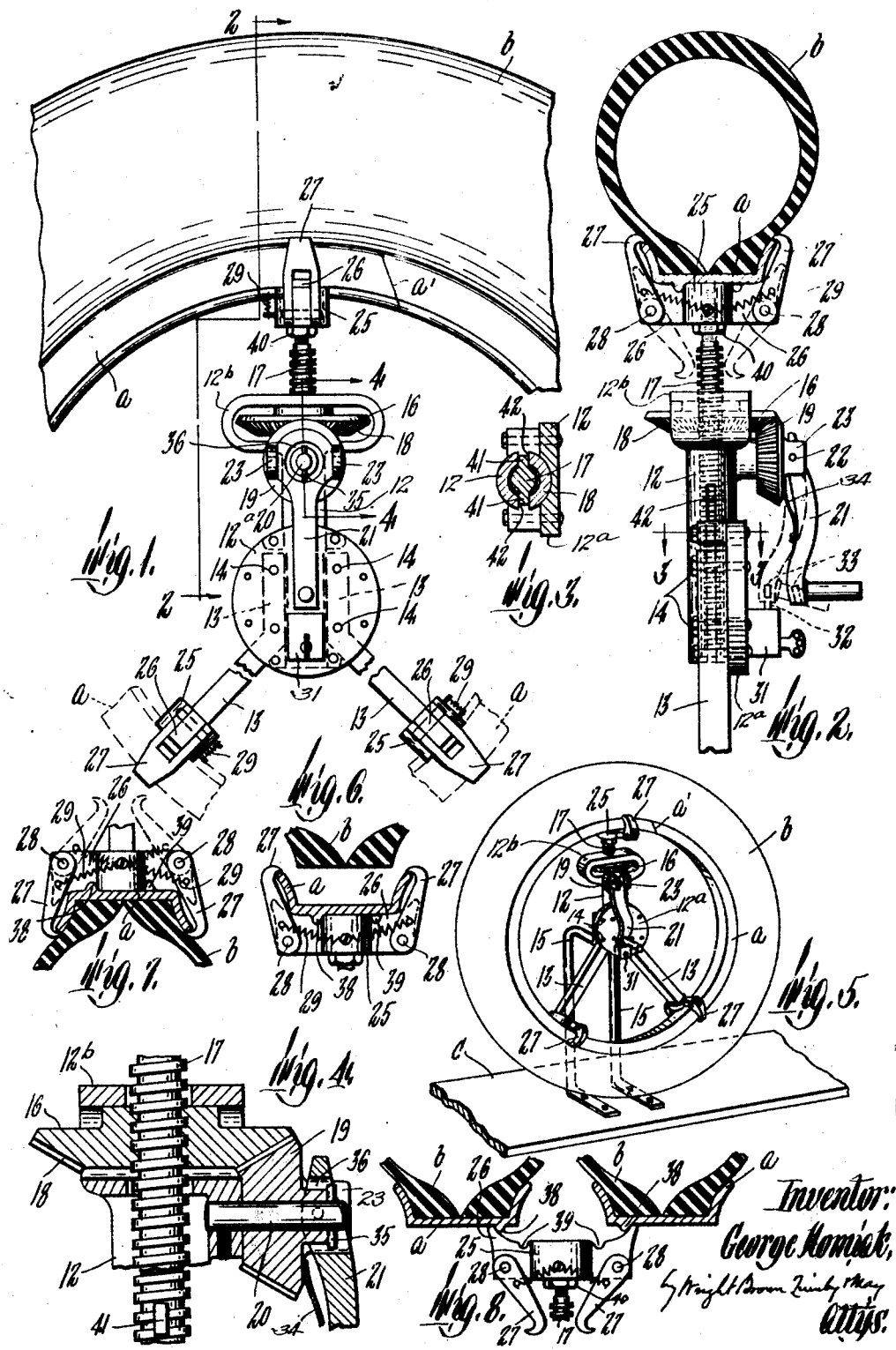
Inventor:
George Homiak,
by Wright Brown Quinby May
attys.

Patented May 7, 1929.

1,712,347

UNITED STATES PATENT OFFICE.

GEORGE HOMIAK, OF NEWMARKET, NEW HAMPSHIRE.

TIRE-RIM HOLDER AND ADJUSTER.

Application filed July 16, 1927. Serial No. 206,304.

This invention relates generally to devices for removing a split rim from a rubber tire with which it is engaged, by contracting the rim so that the tire may be readily separated from it, devices of this character being generally adapted to also exert expanding pressure on the rim to forcibly engage it with the tire.

The invention relates particularly to an appliance attachable in a predetermined position to a motor vehicle, adapted to hold a spare rim and tire, and easily operable to contract and expand the rim.

The invention consists in the improvements hereinafter described and claimed.

Of the accompanying drawings forming a part of this specification,—

Figure 1 shows a side elevation a rim-holder and adjuster embodying the invention, and portions of a rim and tire.

Figure 2 is a section on line 2—2 of Figure 1, and an edge view of the tire-holder and adjuster.

Figure 3 is a section on line 3—3 of Figure 2.

Figure 4 is a section on line 4—4 of Figure 1.

Figure 5 is a perspective view, showing a part of a motor vehicle, a rim-holder and adjuster embodying the invention, attached thereto, and a rim and tire supported by the holder.

Figure 6 is a fragmentary view similar to a portion of Figure 2, showing one of the heads hereinafter described, in position to exert expanding pressure on the rim.

Figure 7 is a fragmentary view similar to Figure 6, showing one of the fixed heads hereinafter described.

Figure 8 is a fragmentary view, showing two rims and portions of two tires supported by the device.

The same reference characters indicate the same parts in all of the figures.

My improved tire rim holder and adjuster comprises a three armed spider formed to occupy the space surrounded by a split rim $a$ and a tire $b$ engaged therewith. The spider includes a hollow arm 12, having a face plate 12$^a$ fixed to its inner end portion and projecting in opposite directions therefrom, a gear-receiving yoke 12$^b$ at its outer end portion, and a laterally projecting stud 20 between the yoke and face plate. The spider also includes two diverging arms 13, rigidly connected with the face plate 12$^a$ by bolts 14.

The spider is provided with means whereby it may be attached in a predetermined position to a part of a motor vehicle. The means for this purpose shown by Figure 5 is embodied in two brackets 15, fixed at their lower ends to a running-board $c$ and at their upper ends to the face plate 12$^a$.

It is obvious that the spider may be supported at the rear end of the vehicle, or elsewhere, and by any other suitable means. 16 designates a rotary nut confined in the yoke 12$^b$. A screw-threaded rod 17, is engaged with the nut and movable longitudinally in the hollow arm 12 by rotation of the nut, so that the rod may be projected from and retracted in the hollow arm.

The nut 16 is rotated by means embodied in bevel gear teeth 18, (Figure 4) on the circular periphery of the nut, a bevel gear 19 journaled on the stud 20, and meshing with the nut teeth, and a crank 21 engaged with the gear 19 to rotate it.

The crank is preferably pivoted at 22 to ears 23, fixed to the gear, the object of this connection between the crank and gear being to permit the crank to normally occupy the full line position shown by Figure 2, and to be displaced from said position as shown by dotted lines, for a purpose hereinafter appearing.

The arms 12 and 13 radiate from a common center, as shown by Figures 1 and 5, and the outer ends of the arms 13 and the rod 17 are spaced apart so that the outer end of the rod may be located adjacent the meeting ends $a'$ of the split rim, while the outer ends of the arms 13 are adjacent spaced apart portions of the rim opposite the ends $a'$, as shown by Figure 5. The outer end of the screw-rod and the outer ends of the arms 13 are provided with rim-engaging clamps which may be of identical construction, so that the following description of the clamp on the screw-rod 17 will describe also the clamps on the arms 13.

The clamp includes a head fixed to the outer end of the screw-rod and composed of a hub portion 25, fixed to the rod, and ears 26, projecting from opposite sides of the hub portion. The outer sides of the hub and ears form a recessed seat which, when in contact with the rim, as shown by Figures 2 and 6, is adapted not only to expand the rim, but also to prevent the rim from moving edgewise in either direction, the ears 26 projecting outward from the hub portion 25, so that they constitute stops which prevent edgewise movement of the rim on the head when the rod 17 is fully projected.

The clamp includes also a pair of jaws, adapted to releasably engage the flanges of the rim and preferably formed as hooked dogs 27, pivoted at 28 to the ears 26, and adapted to engage the flanges of the rim a. The dogs are held yieldingly in engagement with the rim flanges by springs 29.

When the rim and its tire are being carried on a vehicle, the head on the screw-rod and the heads on the arms 13 bear simultaneously on the inner surface of the rim, as indicated by Figures 2 and 7, the screw-rod 17 being projected, and the dogs engaged with the rim flanges, so that the rim is securely held. When the rim is to be contracted, the screw-rod is retracted and draws inwardly the portion of the rim with which the dogs connected with the screw-rod head are engaged, as shown by Figure 6, and by dotted lines in Figure 1. The opposite portion of the rim is rigidly supported by the clamps on the arms 13. The dogs 17 are displaceable, as shown by dotted lines in Figures 2 and 7, to permit the removal of the rim and tire from the device, when the screw-rod is sufficiently retracted to permit such removal.

The rim and a tire thereon may be applied to the holder when the screw-rod is retracted and the dogs displaced, and then secured by projecting the screw-rod and engaging the dogs with the rim flanges, the projection of the screw-rod expanding the rim within the tire.

To prevent unauthorized removal of the rim and tire, I provide locking means for preventing the rotation of the nut 16, so that the screw-rod cannot be retracted. The preferred locking means here shown includes a lock the casing 31 of which is fixed to the face plate 12ª. The lock bolt 32 is adapted to be projected into a recess 33 in the crank 21, when the crank is in the displaced position shown by dotted lines in Figure 2, and thus prevent movement of the crank. A spring 34 fixed to the crank and bearing on the gear 19, normally holds the crank in the full line position of Figure 2, so that the lock is out of the path in which the crank is revolved. The gear 19 may be releasably confined on the stud 20 by a stop pin 35, inserted in the outer end of the stud and bearing on the hub of the gear, as shown by Figure 4. The crank 21 has an orifice 36, through which the stud 20 projects. When the crank is in its normal position, the wall of the orifice 36 prevents the removal of the stop pin 35.

The crank is adapted to be displaced to the dotted line position shown by Figure 2, and thus expose the stop pin 35 so that it may be removed.

The holder is adapted to hold two rims and tires side by side, if desired, as shown by Figure 8, which shows two rims, each having the usual bead 38 on its inner surface, the rims bearing on the outer ends of the ears 26 on the head fixed to the screw-rod 17, the beads 38 contacting with the inner sides of the ears. The rims may bear similarly on the ears of the heads fixed to the arms 13.

The ears of each head are provided with grooves 39, each groove being arranged to receive a bead 38, as shown by Figures 2, 6, and 7.

The screw-rod 17 is preferably provided with a reduced upper end portion with which is engaged a nut 40, adapted to be set up against the head on the screw-rod. Rotation of the screw-rod with the nut is prevented by ears 41 on the rod, arranged to slide in grooves 42 in the hollow arm 12.

I claim:

1. A tire-rim holder and adjuster comprising a three-armed spider composed of a hollow arm having a nut-securing yoke at its outer end and oppositely projecting flanges at its inner end, and two diverging arms fixed to said flanges, and each provided with a pair of rim clamps at its outer end, a screw-threaded rod movable endwise in the hollow arm and extending through orifices in the yoke, the outer end of the rod being provided with a pair of rim clamps, a nut engaged with the threaded rod and rotatable in and confined by the yoke, said nut having a circular gear-toothed periphery, means for preventing rotation of the rod by the nut including a longitudinal groove in the hollow arm, and an ear on the rod slidable in said groove, a gear meshing with the toothed periphery of the nut and journaled on a laterally projecting stud fixed to the hollow arm, and an operating crank engaged with the gear, to rotate the latter and thereby cause rotation of the nut and endwise movement of the rod.

2. A tire-rim holder and adjuster comprising a three-armed spider composed of a hollow arm having a nut-securing yoke at its outer end and oppositely projecting flanges at its inner end, and two diverging arms fixed to said flanges, and each provided with a pair of rim clamps at its outer end, a screw-threaded rod movable endwise in the hollow arm and extending through orifices in the yoke, the outer end of the rod being provided with a pair of rim clamps, a nut engaged with the threaded rod and rotatable in and confined by the yoke, said nut having a circular gear-toothed periphery, means for preventing rotation of the rod by the nut including a longitudinal groove in the hollow arm, and an ear on the rod slidable in said groove, a gear meshing with the toothed periphery of the nut and journaled on a laterally projecting stud fixed to the hollow arm, an operating crank engaged with the gear, to rotate the latter and thereby cause rotation of the nut, and endwise movement of the rod, said crank being pivoted to ears on the gear and normally held by a spring in a predetermined position, and means for locking the crank to the spider when the crank is displaced from said position, said means including a lock casing fixed to the spider and provided with a bolt engageable with the displaced crank.

In testimony whereof I have affixed my signature.

GEORGE HOMIAK.